United States Patent
Gatewood

(10) Patent No.: US 7,953,099 B1
(45) Date of Patent: May 31, 2011

(54) FULLY INTEGRATED JOINED LINE RECORDS

(75) Inventor: John Gatewood, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1170 days.

(21) Appl. No.: 11/623,975

(22) Filed: Jan. 17, 2007

(51) Int. Cl.
*H04L 12/28* (2006.01)

(52) U.S. Cl. ........................................ 370/401; 379/410

(58) Field of Classification Search .................. 370/466, 370/400, 401, 410, 426, 467, 524; 379/219, 379/220.01, 221.08
See application file for complete search history.

(56) References Cited

U.S. PATENT DOCUMENTS

| | | | |
|---|---|---|---|
| 6,002,689 A * | 12/1999 | Christie et al. | 370/401 |
| 6,430,195 B1 * | 8/2002 | Christie et al. | 370/465 |
| 6,690,674 B1 * | 2/2004 | Christie et al. | 370/401 |
| 6,788,693 B1 * | 9/2004 | Christie et al. | 370/401 |
| 6,987,850 B1 * | 1/2006 | Watson | 379/265.02 |
| 7,020,141 B1 * | 3/2006 | Stacey et al. | 370/395.21 |
| 7,106,750 B1 * | 9/2006 | Christie et al. | 370/401 |
| 7,324,534 B2 * | 1/2008 | Christie et al. | 370/410 |
| 7,406,166 B1 * | 7/2008 | Watson et al. | 379/229 |
| 7,725,098 B1 * | 5/2010 | Claudatos et al. | 455/411 |

* cited by examiner

*Primary Examiner* — Creighton Smith

(57) ABSTRACT

A method, system, and medium are provided for routing a call through telecommunications relay services while maintaining desired call information. The present invention includes routing calls through the telecommunications relay services system using a variety of signaling protocols while maintaining call information. A method of integrating line information into a telephone signal is provided. The method includes receiving line information in a packet header and parsing the header to extract the line record information. The parsed information is converted into a set-up message in Integrated Services Digital Network protocol. The method also determines if a specific telephony carrier is identified in the parsed header. If a specific telephone carrier is identified, the signal is directed to the identified carrier along with the set-up message.

13 Claims, 2 Drawing Sheets

FULLY INTEGRATED JOINED LINE RECORDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Deaf or hearing impaired people often use specialized equipment to communicate over telephone lines. This equipment involves a keyboard and display and is usually called a TeleTypewriter (TTY) or Telecommunication Device for the Deaf (TDD). To the extent necessary in this application, the term TTY will be used, as it appears the most used, and most acceptable.

Telephone service providers or carriers offer telecommunications relay services (TRS) that are used to in connection with the TTY devices. TRS provides transmission services that enable an individual who has a hearing impairment or speech impairment to engage in communication in a manner that is functionally equivalent to the communication of those without an impairment. So TRS allows the communication of alphanumeric information over phone lines. In this way, hearing impaired people can communicate in a text-based conversation over the phone lines. While internet-based chat or messaging has become more common, the use of the TTY devices, and TRS, remains widespread The National Exchange Carrier Association (NECA) administers the Telecommunications Relay Services Fund, and collects from various companies based on interstate revenues. NECA then disburses the collected funds to providers of interstate TRS. So there is financial incentive to provide interstate TRS services.

However, service providers may have to comply with both state and federal regulations related to TRS and these regulations may change over time. As these regulations change, providers of TRS are faced with decisions of whether to increase capital expenditures on equipment needed to comply with the new regulations or whether to maintain legacy equipment that has been used previously.

Certain of the new regulations call for signaling to be signaling system 7 (SS7) based, and to allow callers to choose a long distance carrier for their calls. To provide SS7 signaling in a legacy system, an inventor of this application also invented and developed a message conversion system, shown and described in U.S. patent application Ser. No. 10/773,066, filed on Feb. 5, 2004 entitled Message Conversion System, the contents of which are hereby incorporated by reference. Prior to the message conversion system solution, an automatic call distributor (ACD) was used to route calls to an agent that provided service for the call. The ACD associated with TRS would previously have utilized a time-division multiplexed (TDM) communication link between the ACD and a switch on the long distance network. This scenario would not comply with the new requirements for TRS. The solution proposed by the message conversion system includes a message converter associated with the ACD that takes traditional in-band signaling and converts it to the required SS7 output.

A system is thus still needed that can provide SS7 signaling in connection with TRS and that allows carrier of choice. A system is also needed that can employ a relatively low cost method of providing TRS with both SS7 signaling and that allows carrier of choice selection.

SUMMARY

The present invention is defined by the claims below. Embodiments of the present invention solve at least the above problems by providing a system and method for, among other things, routing a call through TRS while maintaining desired call information. The present invention has several practical applications in the technical arts including routing calls through the TRS system using a variety of signaling protocols while maintaining call information. By capturing and maintaining call information, carrier of choice selection is provided, even though conversions of call signaling have taken place. Using such a system, the TRS system can be used to provide calls in SS7 signaling format and allow a caller to choose a carrier of choice.

In a first aspect, a set of computer-useable instructions perform a method of integrating line information into a telephone signal. The instructions receive line information in a packet header and parse the header to extract the line record information. The parsed information is converted into a set-up message in ISDN protocol. The instructions also determine if a specific telephony carrier is identified in the parsed header. If a specific telephone carrier is identified, the signal is directed to the identified carrier along with the set-up message.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
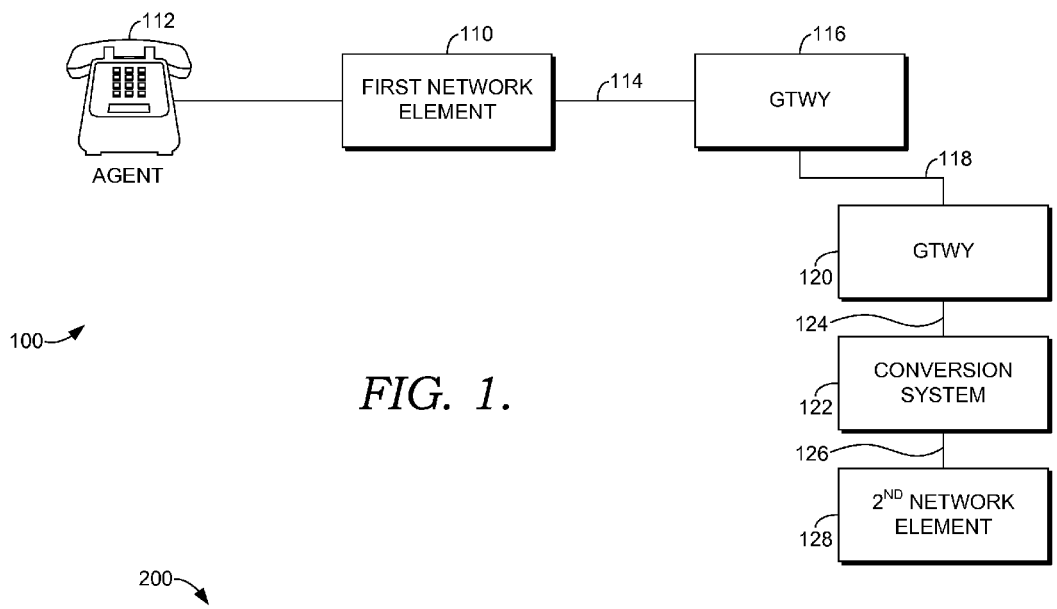
FIG. 1 is a schematic system diagram showing the basic components of the invention and their interaction.

Embodiments of the present invention provide systems and methods for providing signaling within the TRS system. The system allows the signaling to be converted between various formats while maintaining call information throughout the process. By maintaining call information, users of the TRS system can select a carrier of choice, and the system will accommodate that selection. The system also allows and accommodates SS7 signaling, as might be required by various state and federal agencies.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| TTY | TeleTypewriter |
| TDD | Telecommunications Device for the Deaf |
| TRS | Telecommunications Relay Services |
| NECA | National Exchange Carrier Association |
| SS7 | Signaling System 7 |
| ACD | Automatic Call Distributor |
| TDM | Time Division Multiplexed |
| FGD | Feature Group D |
| SIP | Session Initiation Protocol |
| VOIP | Voice Over Internet Protocol |
| UUI | User-to-User Information |
| ISDN | Integrated Services Digital Network |
| OLI | Originating Line Information |
| CIC | Carrier Identification Code |
| TCL | Tool Command Language |

Further, various technical terms are used throughout this description. A definition of such terms can be found in *Newton's Telecom Dictionary* by H. Newton, 22$^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As best seen in FIG. 1, a schematic depiction of a system for use in the present invention is shown and identified generally by the reference numeral 100. The system 100 includes a first network element 110. As an example, network element 110 could be an automatic call distributor (ACD) associated with a telecommunication relay services (TRS) system. In such a case, a number of agents 112 are associated with the network element 110. While only one agent 112 is shown, it should be understood that in practice, many agents 112 are likely used. The ACD (shown as 110) is responsible for routing incoming calls to available agents 112.

First network element 110 is also coupled through a communication link 114 to a gateway 116. Continuing with the TRS example above, the signaling on link 114 leaving the element 110 could be in Feature Group D (FGD) format. FGD is a class of service associated with equal access arrangements. With FGD, for example, phone users can dial 1+ to place a long distance call where the call is handled by a long-distance carrier of choice. This saves the caller from having to first enter a seven or ten digit number, a calling card number and/or an identification number. Gateway 116 is preferably a multi-service router capable of accepting call signaling having a first format and capable of converting the signaling to a different format for transport. As one example, a model 3745 router from Cisco Systems, Inc. of San Jose, Calif. could be used as gateway 116. Continuing with the example above, the gateway 116 accepts the FGD signaling and adapts it for transport over voice over internet protocol (VOIP) transport using Session Initiation Protocol (SIP). The gateway 116 takes the information presented in FGD and passes that information through SIP in the SIP header. While only one gateway 116 and network element 110 are shown, it should be understood that in practice, many gateways and network elements are distributed across a region or country.

With continued reference to FIG. 1, the call and signaling information is sent using SIP over communication link 118 to a second gateway 120. While shown schematically in FIG. 1 in close proximity, gateway 116 is in practice often a great distance from gateway 120. Gateway 120 receives the SIP information and converts it to another signaling format. In a preferred embodiment, gateway 120 receives the SIP information and converts it to integrated services digital network (ISDN) signaling. Gateway 120 contains a script that parses the SIP header for the call information. In a preferred embodiment, the script is written using TCL. The parsed SIP header information is converted by the TCL script into user-to-user information (UUI) which is sent in the set-up message through the data channel in the ISDN signaling. As one example, a model 5850 router from Cisco Systems, Inc. of San Jose, Calif., equipped with a script to parse the SIP header, could be used as gateway 120. It should be understood that more than one gateway 120 can be provided for redundancy. However, in practice there are typically far fewer gateways 120 than gateways 116.

Figure 2:
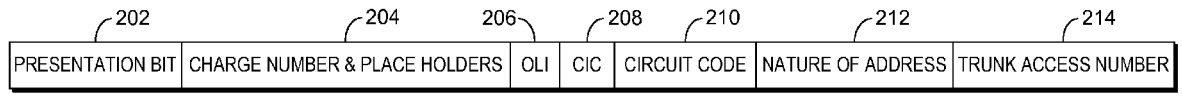
FIG. 2 is a drawing showing the parsed UUI information.

An example UUI parsed from the SIP header and sent from gateway 120 is shown in FIG. 2. The UUI 200 shown in FIG. 2 contains a presentation bit labeled as 202. The presentation bit is used to determine whether the caller number (ANI) is shown or not. The charge number 204 is the calling number (ANI) in ASCII format. Also labeled as 204 is a placeholder that will allow additional information to be placed in the UUI if necessary. As a placeholder the digits are non-ASCII zeroes. The UUI also contains originating line information (OLI) 206 which is in hex format. The OLI information denotes on who to bill for the call. A carrier identification code (CIC) 208 follows. The CIC 208 is a four digit number used by end-user customers to choose a carrier of choice for the call. A circuit code 210 is also included in the UUI. The circuit code 210 informs as to the proper circuit for a particular carrier of choice. The nature of address field 212 allows the gateway 120 to pass the nature of address information, which will allow the display of the caller name, if desired. Finally, a trunk access number 214 is included as a field in the UUI. The trunk access number 214 informs as to which trunk group number is used as the signal is sent from gateway 120. The trunk access number thus is used to place the call on the correct carrier-of-choice trunk.

The ISDN signaling 124 is sent from gateway 120 to a conversion system 122. Conversion system 122 takes in the ISDN signaling with the UUI information and converts the ISDN signaling 124 to SS7 signaling 126. A suitable conversion system 122 for use with the present invention is the SP230 Signal Converter available from Encore Networks of Dulles, Va. Necessary call information is passed via ISDN to the conversion system 122. The call is placed on the designated trunk leaving the conversion system 122 based upon the trunk access number. Leaving the conversion system 122, the signaling 126 is thus routed to an appropriate second network element 128. Second network element 128 in the above example is an appropriate access tandem on the Public Switched Telephone Network (PSTN).

Figure 3:
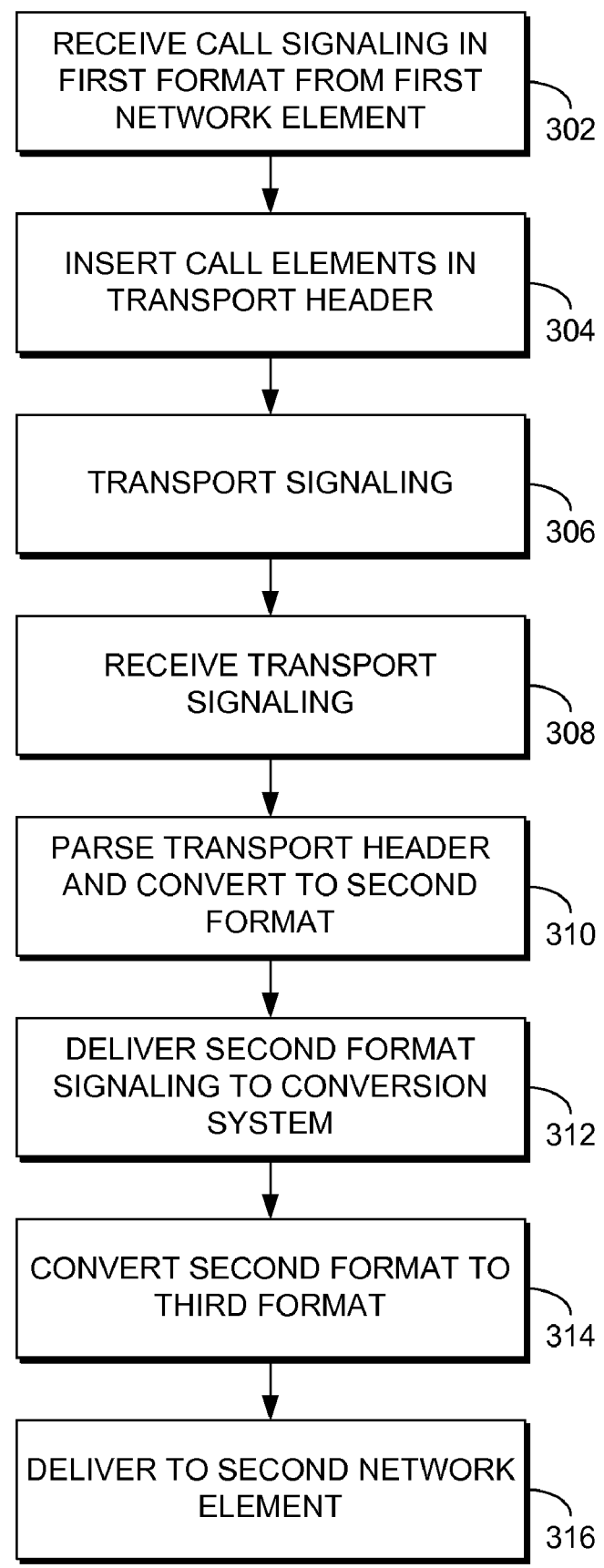
FIG. 3 is a flow chart illustrating the method of the invention.

A method used with system 100 is illustrated in FIG. 3. As shown, the method begins with the receipt of call signaling in a first format from a first network element at step 302. After receipt, the elements of the call signaling are inserted in a transport header, as shown at 304. The signaling is then sent at step 306 and received at step 308. The method continues at step 310 by parsing the transport header and converting the signaling into a different format. This converted signaling is delivered to a conversion system in step 312. The signaling is yet again converted into a third format at step 314 and is delivered to a second network element in step 316.

To better understand the system 100 of FIG. 1 and the method illustrated in FIG. 3, an illustrative example will be discussed. A caller using a TTY device will dial an appropriate number to access the TRS system. This call is received by an ACD, which is one example of first network element 110. The call is routed by the ACD to an available agent 112 to assist in the call. The call is then directed to gateway 116 to be readied for transport. As discussed above, gateway 116 places the FGD information in a SIP header and transports the call using VOIP. The call is routed over VOIP to second gateway 120, where the SIP header is parsed by the TCL script to extract the call information and place it in ISDN format, which is then delivered to the conversion system 122. The message conversion system converts the ISDN UUI and formats the fields to SS7 signaling and completes the call connection over the SS7 network. Importantly, the FGD information is maintained and used throughout the call process, such that it is available for extraction by the TCL script. By capturing and maintaining the call information, such things as carrier of choice are preserved throughout the call process, even though conversions of the call signaling between various formats have taken place. Using the system explained above, a deaf or hard of hearing user can access the TRS system as always. But the TRS system now provides a call in SS7 signaling and allows a caller to chose a carrier of choice.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of integrating line record information into a telephony signal, the method comprising:
   receiving line record information in a packet header that identifies parameters of a telephone signal;
   parsing the header to extract the line record information; and
   determining if a specific telephony carrier is identified, and if so, directing the signal to said identified carrier.

2. The method of claim 1, further comprising converting the parsed header line record information into a set-up message in integrated services digital network protocol.

3. The method of claim 1, wherein the received line record information packet is in the form of a Session Initiation Protocol (SIP) header.

4. The method of claim 1, wherein the parsing step is achieved through the use of computer-useable instructions in the form of a TCL script.

5. The method of claim 2, wherein the set-up message is formatted as User-to-User Information in the set-up message.

6. The method of claim 1, wherein the received line record information originates from an automatic call distributor associated with a telephone relay service provided to assist the hearing impaired.

7. The method of claim 2, further comprising converting the signaling from ISDN format into SS7 format.

8. A computer implemented method for providing carrier of choice selection within a telecommunications relay services (TRS) system, the method comprising:
   receiving line record information in feature group D (FGD) format and placing the line record information in a packet header;
   delivering the line record information through a network;
   parsing the header to extract the line record information;
   converting the parsed header line record information into a set-up message in integrated services digital network protocol; and
   determining if a specific telephony carrier is identified, and if so, directing the signal to said identified carrier along with the set-up message.

9. The method of claim 8, wherein the received line record information is placed in a Session Initiation Protocol (SIP) packet header.

10. The method of claim 9, wherein the parsing step is achieved through the use of computer-useable instructions in the form of a TCL script.

11. The method of claim 8, wherein the set-up message is formatted as User-to-User Information in the set-up message.

12. The method of claim 11, wherein the received line record information originates from an automatic call distributor associated with a TRS.

13. The method of claim 12, further comprising converting the signaling from ISDN format into SS7 format.

* * * * *